United States Patent
Eastwood

(10) Patent No.: US 10,444,516 B2
(45) Date of Patent: Oct. 15, 2019

(54) HEAD-WORN DISPLAY APPARATUS HAVING FLEXIBLE STEMS

(71) Applicant: North Inc., Kitchener (CA)

(72) Inventor: Mark J. Eastwood, Kentfield, CA (US)

(73) Assignee: North Inc., Kitchener, ON (CA)

( * ) Notice: Subject to any disclaimer, the term of this patent is extended or adjusted under 35 U.S.C. 154(b) by 29 days.

(21) Appl. No.: 15/480,036

(22) Filed: Apr. 5, 2017

(65) Prior Publication Data

US 2018/0292660 A1 Oct. 11, 2018

(51) Int. Cl.
*G02B 27/14* (2006.01)
*G02B 27/01* (2006.01)
*G02C 5/20* (2006.01)
*G02C 5/16* (2006.01)

(52) U.S. Cl.
CPC ..... *G02B 27/0176* (2013.01); *G02B 27/0172* (2013.01); *G02C 5/16* (2013.01); *G02C 5/20* (2013.01); *G02B 2027/0154* (2013.01); *G02B 2027/0178* (2013.01)

(58) Field of Classification Search
CPC ...... G02B 7/002; G02B 7/004; G02B 27/017; G02B 27/01; G02B 2027/0178; G02B 2027/014; G02B 2027/0138; G02B 2027/0169
USPC ............................ 359/13, 630, 632; 345/7–9
See application file for complete search history.

(56) References Cited

U.S. PATENT DOCUMENTS

| | | | |
|---|---|---|---|
| 8,092,011 B2* | 1/2012 | Sugihara | G02B 27/0172 351/158 |
| 9,128,283 B1 | 9/2015 | Heinrich et al. | |
| 9,158,116 B1 | 10/2015 | Osterhout et al. | |
| 2013/0176626 A1 | 7/2013 | Heinrich et al. | |
| 2013/0249776 A1 | 9/2013 | Olsson et al. | |
| 2013/0258271 A1 | 10/2013 | Cazalet et al. | |
| 2014/0253867 A1 | 9/2014 | Jiang et al. | |
| 2016/0004086 A1* | 1/2016 | Ko | G02B 27/0176 345/8 |

* cited by examiner

*Primary Examiner* — Mahidere S Sahle
(74) *Attorney, Agent, or Firm* — Thomas Mahon

(57) ABSTRACT

Methods, apparatus, and articles of manufacture are disclosed. An example head-worn display apparatus includes a frame to support a lens and a housing having an image generator. The housing couples the image generator to the frame and is to project an image adjacent the lens. The apparatus includes a stem having a first end and a second end. The first end of the stem is to couple to the housing of the image generator and the second end of the stem to project from the image generator. The stem has a non-flexed use position and a flexed use position, where at least a portion of the stem between the first end and the second end is to move relative to the housing of the image generator when the stem moves between the non-flexed position and the flexed position while a position of the image generator remains in a fixed relationship relative to the frame.

21 Claims, 13 Drawing Sheets

HEAD-WORN DISPLAY APPARATUS HAVING FLEXIBLE STEMS

FIELD OF THE DISCLOSURE

This disclosure relates generally to wearable devices, and, more particularly, to head-worn display apparatus having flexible stems.

BACKGROUND

Wearable devices, such as head-worn displays, provide computing devices that mimic an appearance of head-worn glasses or sunglasses (e.g., smart glasses).

Figure 1A:
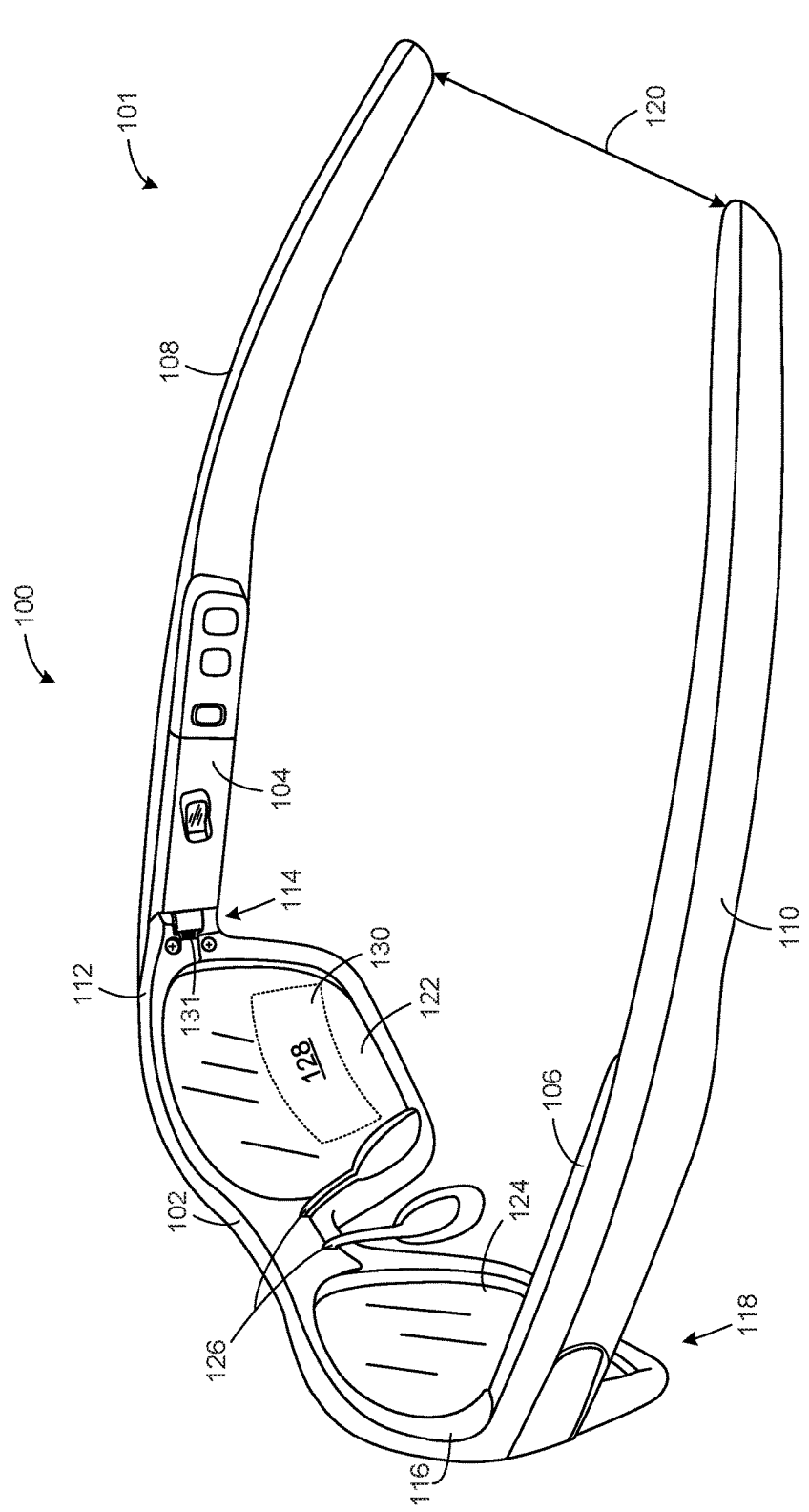
FIG. 1A is a perspective view of an example head-worn display constructed in accordance with the teachings of this disclosure.

The figures are not to scale. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Head-worn display apparatus (e.g., smart glasses) employ a computing platform to project information (e.g., digital imagery) that is super imposed over a real-world view as perceived by a user looking through the head-worn display (e.g., augmented reality). To project the digital imagery, head-worn display apparatus employ an image source such as, for example, an optical engine or projector. In some examples, the image source projects digital imagery to a precise location associated with a viewing angle of a user wearing the head-worn display apparatus. For example, the image source may be positioned to project the digital imagery across a specific portion, for example, of a lens of the head-worn display apparatus.

To support the image source, example head-worn display apparatus may employ a frame, a stem (e.g., a temple arm or eye piece) and/or other supporting structure of a head-worn display apparatus. In some such examples, a stem maintains the image source in a fixed relationship relative to the frame of a head-worn display apparatus. To maintain the fixed relationship, stems or other supporting structure may be rigidly attached to the frame such that the stem does not move, flex or adjust (e.g., rotate) relative to a frame supporting the lens of the head-worn display apparatus.

However, preventing adjustment of a stem or other structure supporting an image source relative to the frame may restrict or prevent the head-worn display apparatus from comfortably fitting a user. For example, a non-adjustable stem provides a "one-size fits all" and does not adjust to accommodate head sizes of different users (e.g., heads having different widths or circumferences). Thus, in some instances, a head-worn display apparatus may not fit properly (e.g., be too tight or too loose) around a head of a user, thereby limiting fit and/or comfort characteristic(s) of example head-worn display apparatus. As a result, an improperly fitting head-worn display apparatus (e.g., that is too tight or too loose) may become uncomfortable to a user after a relatively short time (e.g., after several minutes) of wearing the head-worn display. Thus, user comfort is typically sacrificed to ensure proper alignment and/or location of digital imagery provided by the image source.

Example head-worn display apparatus disclosed herein provide precise alignment and/or location of a digital image and accommodate different users without sacrificing user comfort. More specifically, example head-worn display apparatus disclosed herein may be adjustable to fit different sized heads of users without affecting a position of digital imagery displayed or projected by an image source, thereby increasing user comfort characteristic(s). For example, enabling a proper fit of example head-worn display apparatus disclosed herein enables users to comfortably wear example head-worn display apparatus disclosed herein for extended periods of time (e.g., at least for several hours).

To accommodate different users and improve comfort characteristic(s), example head-worn display apparatus disclosed herein employ adjustable stems or ear pieces. For example, example head-worn display apparatus disclosed herein employ a stem or ear piece that operatively or effectively decouples or detaches (e.g., at least partially moves away) from an image source (e.g., a retinal scan device of an optical projector) and/or a frame of example head-worn display apparatus disclosed herein. To operatively or effectively decouple example stems disclosed herein from an example image generator and/or an example frame of example head-worn display apparatus disclosed herein, example stems disclosed herein can flex or deform (e.g., elastically deform) relative to the image source and/or a frame to comfortably fit a head of a user.

For example, to adjust for different users, at least a portion of an example stem disclosed herein can move or flex relative to a housing of an image generator and/or the frame between a non-flexed use position and a flexed use position. In the non-flexed use position, for example, at least a portion of an example stem disclosed herein may be in contact (e.g., direct contact) with (e.g., an outer surface of a housing of) an example image generator or image source. In the flexed use position, for example, the at least the portion of the example stem disclosed herein may move relative to (e.g., detach or space away from a housing of) the example image generator.

Although an example stem disclosed herein can flex or move relative to the image source, the example head-worn display apparatus disclosed herein maintain a fixed relationship between the frame and the image generator (e.g., in a vertical direction and a horizontal direction) when the stem moves or flexes between a non-flexed use position and a flexed use position. Additionally, example head-worn display apparatus disclosed herein employ connectors and/or locators to improve or reduce manufacturing tolerances between different components of the example head-worn display apparatus (e.g., stems, a frame, an image generator housing, a power source housing, etc.). Example connectors and/or locators disclosed herein ensure proper positioning of imagery provided by an example image generator relative to a display area (e.g., a lens) of example head-worn display apparatus disclosed herein.

Figure 1B:
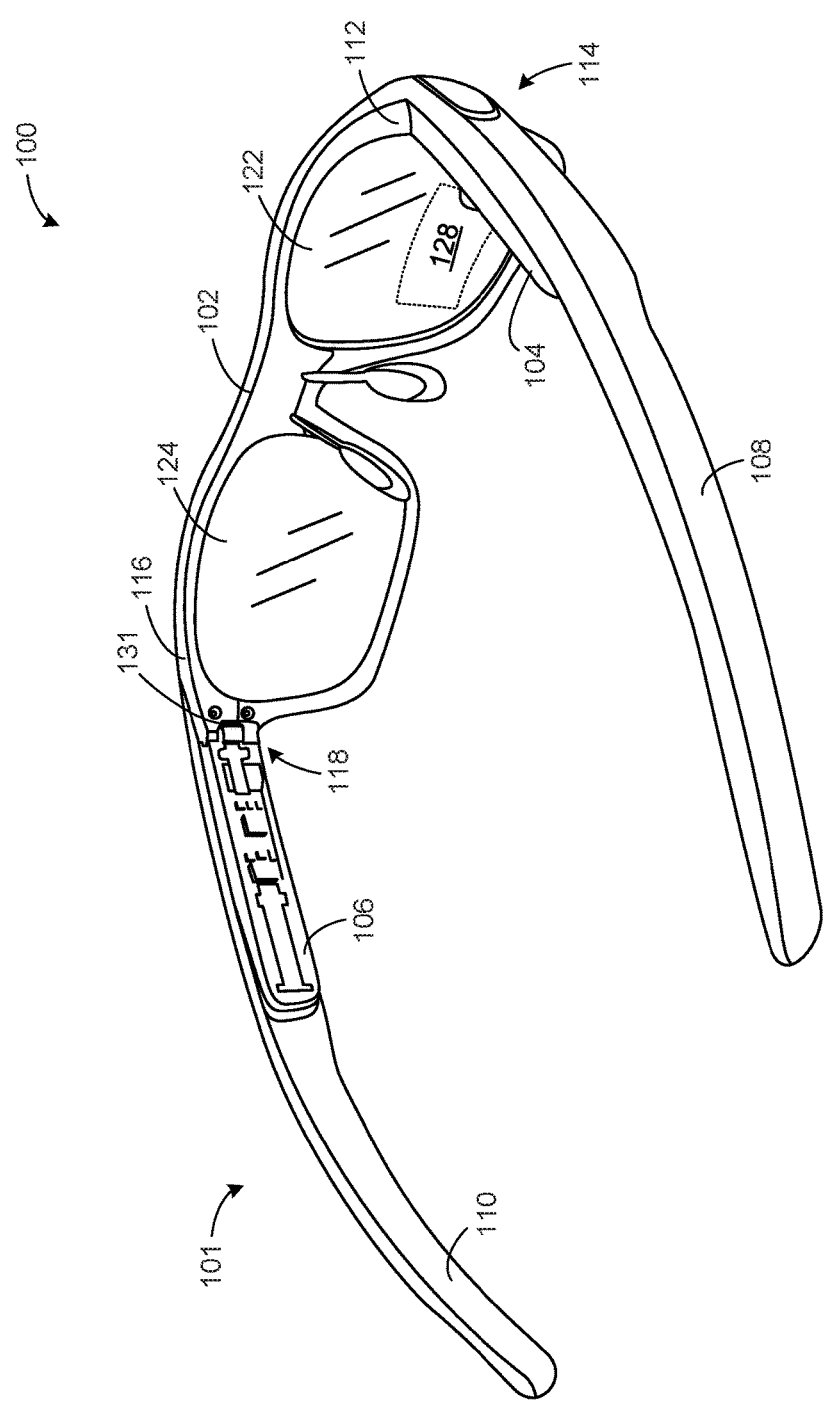
FIG. 1B is another perspective view of the example head-worn display of FIG. 1A.

FIGS. 1A and 1B are perspective views of an example head-worn display apparatus 100 constructed in accordance with the teachings of this disclosure. Referring to FIGS. 1A and 1B, the head-worn display apparatus 100 of the illustrated example may be a wearable computing device configured to receive information, transmit information and/or to display information. The head-worn display apparatus 100 of the illustrated example is formed in the shape of a pair of eyeglasses (e.g., smart glasses). In some examples, the head-worn display apparatus 100 may be in the form of goggles, a shield, and/or another wearable device that may be interposed in a viewing angle of a user when the head-worn display apparatus 100 is worn by a user. The head-worn display apparatus 100 of the illustrated example is shown in a use position 101 in FIGS. 1A and 1B.

The head-worn display apparatus 100 of the illustrated example includes a frame 102, an image generator 104 (e.g., a retinal scan device), a power source 106, a first stem 108 (e.g., a right-side ear piece) and a second stem 110 (e.g., a left-side ear piece). The image generator 104 of the illustrated example is coupled to a first side 112 of the frame 102 via a first connection 114 and the power source 106 of the illustrated example is coupled to a second side 116 of the frame 102 opposite the first side 112 via a second connection 118.

To secure the head-worn display apparatus 100 to a user, the head-worn display apparatus 100 of the illustrated example includes the first stem 108 and the second stem 110. In particular, the first stem 108 of the illustrated example is adjacent the image generator 104 and the second stem 110 of the illustrated example is adjacent the power source 106. The first stem 108 of the illustrated example couples to at least one of the image generator 104 and/or the first side 112 of the frame 102, and the second stem 110 of the illustrated example couples to at least one of the power source 106 and/or the second side 116 of the frame 102.

In the illustrated example, the image generator 104 and/or the first stem 108 are cantilevered from the frame 102 via the first connection 114 and the power source 106 and the second stem 110 are cantilevered from the frame 102 via the second connection 118. The image generator 104 and/or the first stem 108 and the power source 106 and/or the second stem 110 extend or project in a direction away from the frame 102 when the head-worn display apparatus 100 is in the use position 101.

The first stem 108 and the second stem 110 of the illustrated example define a dimensional characteristic 120 (e.g., a distance) between which a head of user may be positioned. As described in greater detail below, to adjust (e.g., increase) the dimensional characteristic 120 between the first stem 108 and the second stem 110, each of the first stem 108 and the second stem 110 of the illustrated example can move or flex relative to the frame 102 and/or the image generator 104 or the power source 106. As described in greater detail below, the first stem 108 and/or the second stem 110 of the illustrated example can flex or bend away from each other to vary (e.g., increase or decrease) the dimensional characteristic 120 between (e.g., ends of) the first stem 108 and the second stem 110 to accommodate different sized heads and thereby improve user comfort characteristic(s).

Additionally, movement of the first stem 108 relative to the image generator 104 and/or the frame 102 and movement of the second stem 110 relative to the power source 106 and/or the frame 102 to increase a dimensional characteristic 120 (e.g., a distance) of the head-worn display apparatus 100 does not affect a position of the image generator 104 relative to the frame 102. For example, the first stem 108 can flex relative to the second stem 110 to accommodate different users without changing or altering a position of the image generator 104 relative to the frame 102.

The frame 102 of the illustrated example supports a first lens 122 and a second lens 124. The frame 102 of the illustrated example includes a nose support 126 to provide comfort and/or support when the head-worn display apparatus 100 is worn by a user. In some examples, to improve user comfort, the nose support 126 may be adjustable relative to the frame 102. The frame 102 of the illustrated example may be hollow and/or may include one or more cavities or channels to receive (e.g., route) electrical contacts, electrical wires, and/or other electrical circuitry (e.g., contacts 131) to electrically couple the power source 106 and the image generator 104. In some examples, channels formed in the frame 102 may be lined, layered with, and/or formed from conductive material(s) (e.g., electrically conductive traces, copper traces, etc.) to provide an electrical path between the power source 106 and the image generator 104.

The first lens 122 and the second lens 124 of the illustrated example are sufficiently transparent (e.g., fully transparent, partially transparent) to allow a user to see the environment through the first lens 122 and/or the second lens 124. For example, the first lens 122 and/or the second lens 124 may be 50% percent clear or transparent, 85% clear or transparent, 100% clear or transparent and/or any other clarity/transparency variation. The first lens 122 and/or the second lens 124 may be formed from glass, plastic and/or any other suitable material(s). In some examples, the head-worn display apparatus 100 may include only one lens or a shield (e.g., a unitary lens, a one-piece glass or plastic lens) that extends between the first side 112 of the frame 102 and the second side 116 of the frame 102.

In the illustrated example, (e.g., at least a portion of) the first lens 122 includes a reflective surface or reflective material 128 that can display an image or graphic when light (e.g., a spectrum or frequency of light in the Red, Blue, Green (RBG) light spectrum) projects from the image generator 104 towards or onto the first lens 122. In some examples, the image generator 104 overlays or interposes an image (e.g., holographic image) in a portion 130 (e.g., an area) that is within a perimeter defined by the first lens 122. For example, the reflective material 128 of the first lens 122 may include, for example, a holographic film (e.g., a transparent or semi-transparent holographic film) that provides a reflective surface for displaying a holographic image when the image generator 104 projects light on the reflective material 128. In some examples, although the entire surface area of the first lens 122 may include a holographic film or layer, only the portion 130 of the first lens 122 (e.g., a holographic film) may be configured (e.g., recorded) to reflect a specific frequency (e.g., RGB frequency) of light provided by the image generator 104. Thus, an image may overlay only the portion 130 of a total area of the first lens 122 (e.g., the first lens) even when light from the image generator 104 projects across an entire surface area of the first lens 122. The reflective material 128 (e.g., the holographic film) may be encapsulated with the first lens 122, laminated with the first lens 122, and/or applied to the first lens 122 using any other suitable manufacturing technique(s). In some examples, the second lens 124 and may include a reflective material (e.g., a holographic film). In some examples, the first lens 122 and/or the second lens 124 may include no vision correction characteristics (i.e., no prescription). In other examples, the first lens 122 and/or the second lens 124 may include vision correction (i.e., prescription lenses) characteristic(s).

To project or overlay an image (e.g., a digital image) adjacent (e.g., over) the first lens 122, the head-worn display apparatus 100 of the illustrated example employs the image generator 104. The image generator 104 of the illustrated example is projector or optical engine (e.g., a micro-projector, a pico-projector, a retina projector, retinal scan device, etc.). The image generator 104 of the illustrated example causes an image interposed in a viewing angle of a user to enable the user wearing the head-worn display apparatus 100 to see the environment through the first lens 122 and/or the second lens 124 and see, simultaneously, the imagery across the reflective material 128 generated by the image generator 104. In some examples, the image may appear (e.g., as a holographic image) between a user's eye and the first lens 122.

To provide electrical power to the image generator 104, the head-worn display apparatus 100 includes the power source 106. The power source 106 of the illustrated example is a battery (e.g., a lithium ion battery) that is coupled to the second side 116 of the frame 102. As noted above, one or more electrical connectors or couplings may be positioned in the frame 102 to electrically couple the power source 106 and the image generator 104. In some examples, the power source 106 may be integrated with the image generator 104. For example, a power source may be positioned adjacent the image generator 104 and/or may be positioned in a housing of the image generator 104 instead of the power source 106 or in addition to the power source 106.

FIGS. 2A, 2B and 3-10 illustrate an example manner in which the image generator 104 is coupled to the first stem 108 and the frame 102. The power source 106 and the second stem 110 are coupled together and/or coupled to the frame 102 in a similar (e.g., identical) manner in which the image generator 104 couples to the first stem 108 and/or the image generator 104 and/or the first stem 108 couple to the frame 102. Therefore, the second connection 118 of the second stem 110 and/or the power source 106 to the frame 102 and the connection between the second stem 110 and the power source 106 will not be discussed. Instead, the interested reader may refer to FIGS. 2A, 2B and 3-10.

Figure 2A:
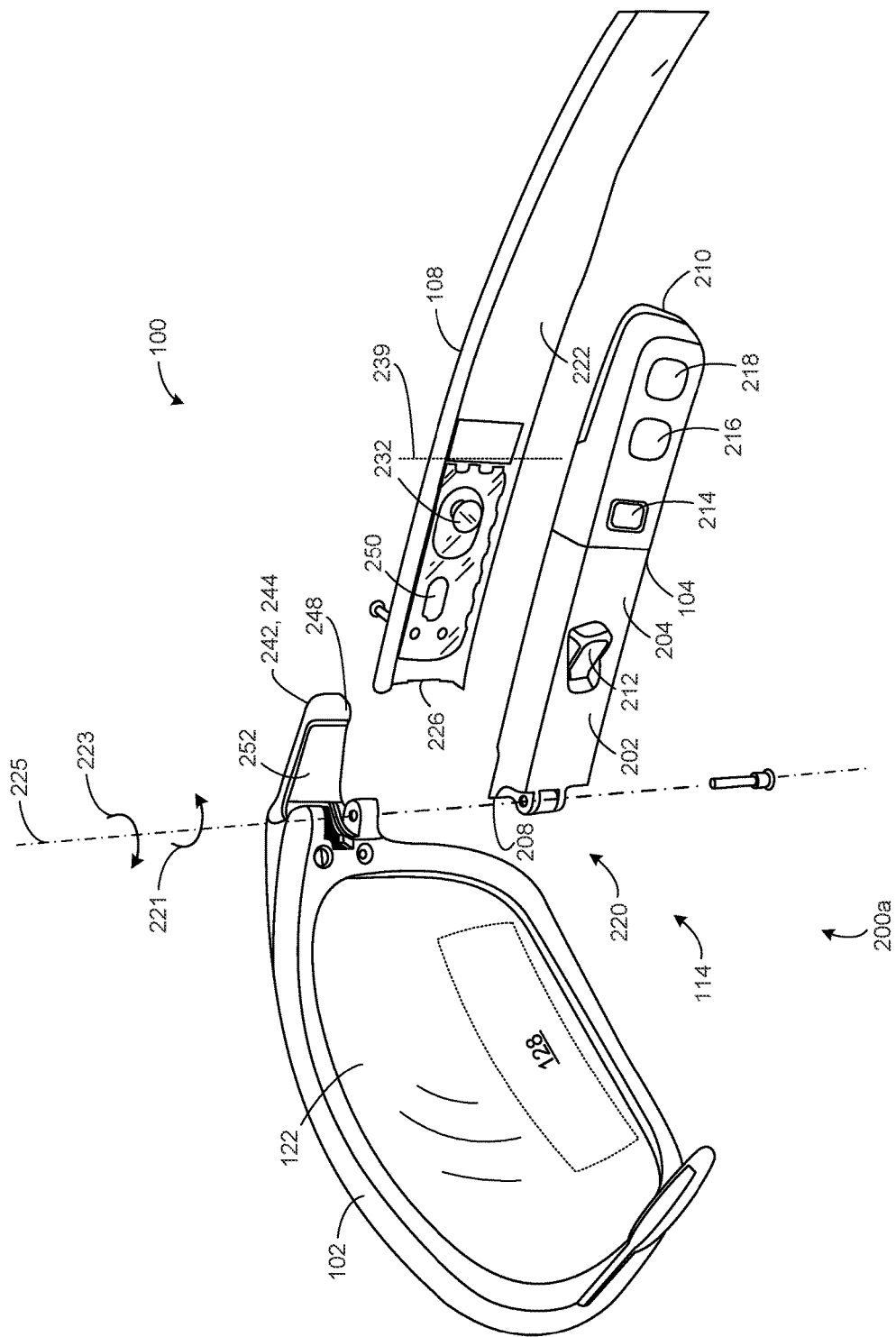
FIG. 2A is a partial exploded, perspective view of the example head-worn display of FIGS. 1A and 1B.
Figure 2B:
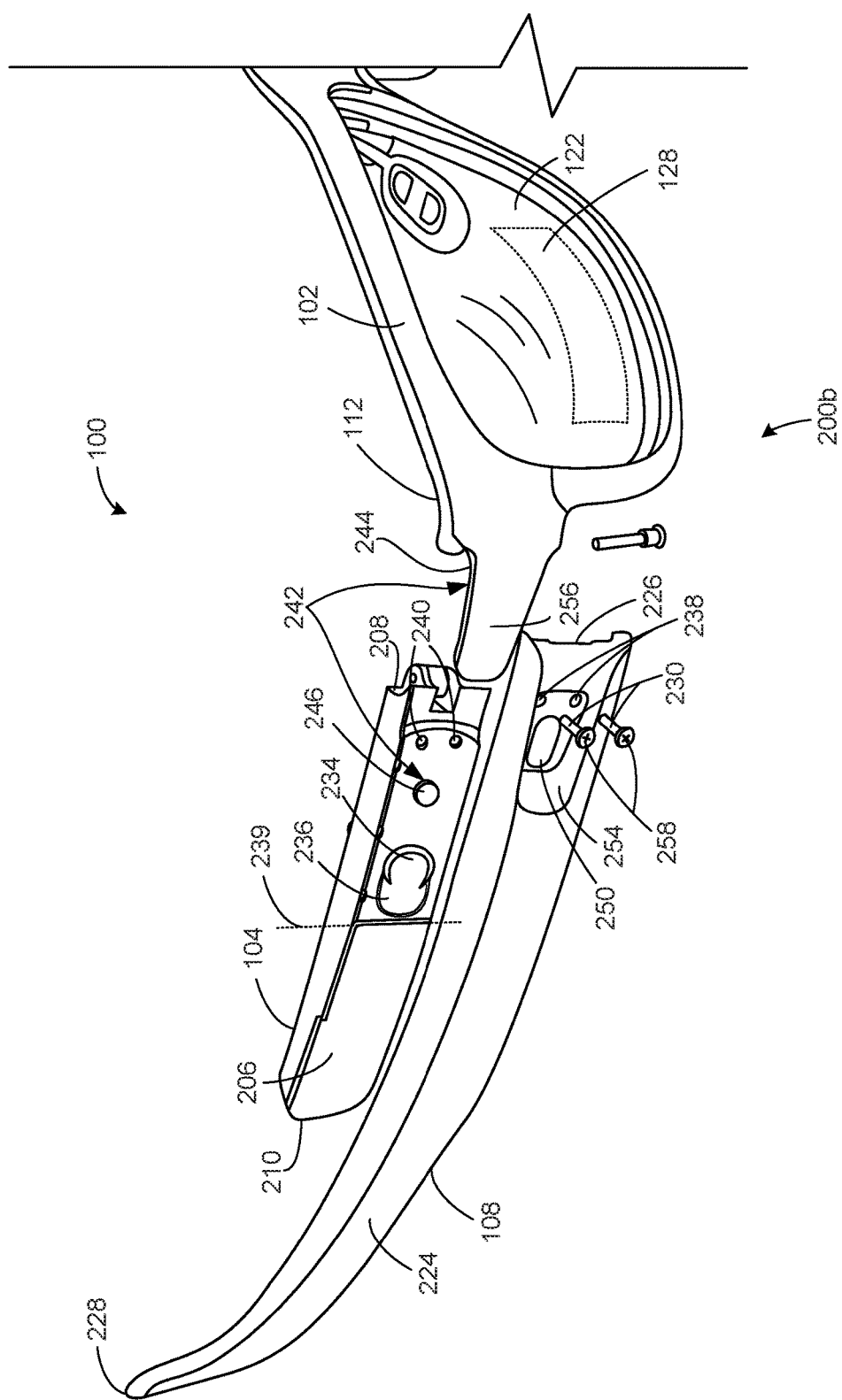
FIG. 2B is another a partial exploded, perspective view of the example head-worn display of FIGS. 1A, 1B and 2A.

FIGS. 2A and 2B are partial exploded, perspective views of the head-worn display apparatus 100 of FIGS. 1A and 1B. The orientation of FIG. 2A is from a perspective looking toward an inner side 200a of the head-worn display apparatus 100 of the illustrated example, and an orientation of FIG. 2B is from a perspective looking toward an outer side 200b of the head-worn display apparatus 100.

The image generator 104 of the illustrated example includes a housing 202 having an inner surface 204 and an outer surface 206 opposite the inner surface 204 defined between a first end 208 and a second end 210 opposite the first end 208. The inner surface 204 of the housing 202 of the illustrated example includes an image source 212 (e.g., a light source, an LED source, a plurality of lights, etc.) to project light onto the reflective material 128 of the first lens 122. The image generator 104 of the illustrated example may include a sensor 214, a microphone 216, a speaker 218, a processor, a circuit board, an antenna, a transmitter, an input/output interface and/or other electronic component(s) positioned in and/or accessible via the housing 202.

To pivotally couple the image generator 104 to the frame 102 (e.g., the first side 112 of the frame 102), the head-worn display apparatus 100 includes the first connection 114. The first connection 114 of the illustrated example is a hinge 220. The hinge 220 of the illustrated example enables rotation of the housing 202 and the first stem 108 relative to the frame 102 in a first rotational direction 221 and a second direction 223 opposite the first rotational direction 221 about a pivot axis 225 defined by the hinge 220. In some examples, the first connection 114 may be another other connection (e.g., a ball joint) that enables pivotal motion of the image generator 104 relative to the frame 102 and/or a connection to fix the image generator 104 relative to the frame 102 (e.g., such that the image generator 104 and/or the first stem 108 does not rotate relative to the frame 102). The hinge 220 is described in greater detail in connection with FIG. 3.

The first stem 108 of the illustrated example includes an inner surface 222 and an outer surface 224 opposite the inner surface 222 defined between a first end 226 of the first stem 108 and a second end 228 opposite the first end 226. To couple the first stem 108 to the frame 102, the first stem 108 of the illustrated example is coupled or attached to the housing 202. More specifically, the first end 226 of the first stem 108 of the illustrated example is coupled to (e.g., directly attached to) the first end 208 of the housing 202. In the illustrated example, the first end 226 of the first stem 108 is coupled to the first end 208 of the housing 202 via fasteners 230 (e.g., screws). However, in some examples, the first end 226 of the first stem 108 may be coupled to the housing 202 via snap fit connection, pins, rivets, chemical fastener(s) (e.g., adhesive) and/or any other suitable fastener(s).

To secure the first stem 108 to the housing 202 and/or to provide a deflection point of the first stem 108 relative to the housing 202 when the first stem 108 flexes relative to the housing 202, the first stem 108 of the illustrated example includes a protrusion or knob 232 that engages a retainer 234 formed on the outer surface 206 of the housing 202. To couple the knob 232 with the retainer 234, the housing 202 of the illustrated example a slot or track 236. To couple the first stem 108 to the housing 202, the knob 232 of the first stem 108 slides in the track 236 of the outer surface 206 of the housing 202 toward the retainer 234. In turn, the retainer 234 of the illustrated example engages at least a portion of the knob 232 to prevent the knob 232 from moving (e.g., in a direction) away from the outer surface 206 of the housing 202.

Additionally, when the knob 232 of the illustrated example is in engagement with the retainer 234, the knob 232 and the retainer 234 provide an interface that enables the second end 228 of the first stem 108 to flex relative to the first end 226 a flex point 239 (e.g., a flex axis, a flex line, a pivot point, flex or pivot area). The flex point 239 of the illustrated example is positioned adjacent the knob 232 and the retainer 234. In particular, the flex point 239 is positioned between the second end 228 of the stem and the knob 232 of the first stem 108. As described in greater detail below, the second end 228 of the first stem 108 flexes relative to the first end 226 about the flex point 239.

Additionally, coupling the knob 232 of the first stem 108 with the retainer 234 of the housing 202 causes alignment between openings 238 (e.g., threaded openings, non-treaded openings) of the first stem 108 and openings 240 (e.g., threaded openings) of the housing 202 that receive the fasteners 230. In some examples, the fasteners 230 may be pins (e.g., tapered pins), rivets and/or any other fastener(s).

To align the image generator 104 (e.g., the image source 212) relative to the reflective material 128 of the first lens 122 when the first stem 108 and the housing 202 of the image generator 104 are in the use position 101 (e.g., shown in FIGS. 1A and 1B), the head-worn display apparatus 100 of the illustrated example includes a position locator 242. The position locator of the illustrated example includes a wing or frame tab 244 and a protrusion or touch-off tab 246. The frame tab 244 of the illustrated example protrudes (e.g., is cantilevered) from the first side 112 of the frame 102 and the touch-off tab 246 protrudes from (e.g., projects in a direction away from) the outer surface 206 of the housing 202. In the illustrated example, the frame tab 244 has a lip 248 (e.g., a shoulder) that is to engage or align with the touch-off tab 246 formed on the outer surface 206 of the housing 202 when the head-worn display apparatus 100 is in the use position 101 (e.g., shown in FIGS. 1A and 1B). The first end 226 of the first stem 108 of the illustrated example is positioned between an inner surface 252 of the frame tab 244 and the outer surface 206 of the housing 202. The touch-off tab 246 may be formed with the housing 202 during manufacturing via, for example, machining, injection molding and/or any other manufacturing technique(s). In some examples, the touch-off tab 246 may be coupled to the outer surface 206 during an assembly process via, for example, a mechanical fastener (e.g., a screw, a rivet, etc.), a chemical fastener (e.g., adhesive, plastic welding, etc.) and/or any other fastener(s). In some examples, the touch-off tab 246 may be positioned on the frame tab 244.

To enable the frame tab 244 and/or the lip 248 of the frame 102 to access the touch-off tab 246 located on and/or protruding from the outer surface 206 of the housing 202 when the first stem 108 is coupled to the housing 202, the first stem 108 of the illustrated example includes an opening 250 (e.g., a slot or elongated opening). The opening 250 of the illustrated example is formed through the inner surface 222 and outer surface 224 of the first stem 108.

To receive the frame tab 244, the outer surface 224 of the first stem 108 of the illustrated example includes a recessed cavity 254. The recessed cavity 254 of the illustrated example is adjacent the opening 250. Additionally, the opening 250 of the illustrated example is positioned adjacent the openings 238 that receive the fasteners 230 such that the frame tab 244 extends across the openings 238 to enable positioning of the lip 248 relative to the opening 250 and the frame tab 244 to be positioned in the cavity 254 leading towards the opening 250. Thus, the frame tab 244 of the frame 102 of the illustrated example overlaps or covers the fasteners 230 to improve, for example, an aesthetic appearance of the head-worn display apparatus 100.

In addition, to improve aesthetic appearance of the head-worn display apparatus 100 of the illustrated example, when the frame tab 244 of the illustrated example is positioned in the cavity 254, the outer surface 224 of the first stem 108 is substantially flush relative to an outer surface 256 of the frame tab 244 (e.g., opposite the inner surface 252). Further, a head 258 of each of the fasteners 230 is recessed relative to the outer surface 224 of the first stem 108 and/or an outer surface defining the cavity 254 to prevent or avoid interfere with the frame tab 244 of the frame 102.

Figure 3:
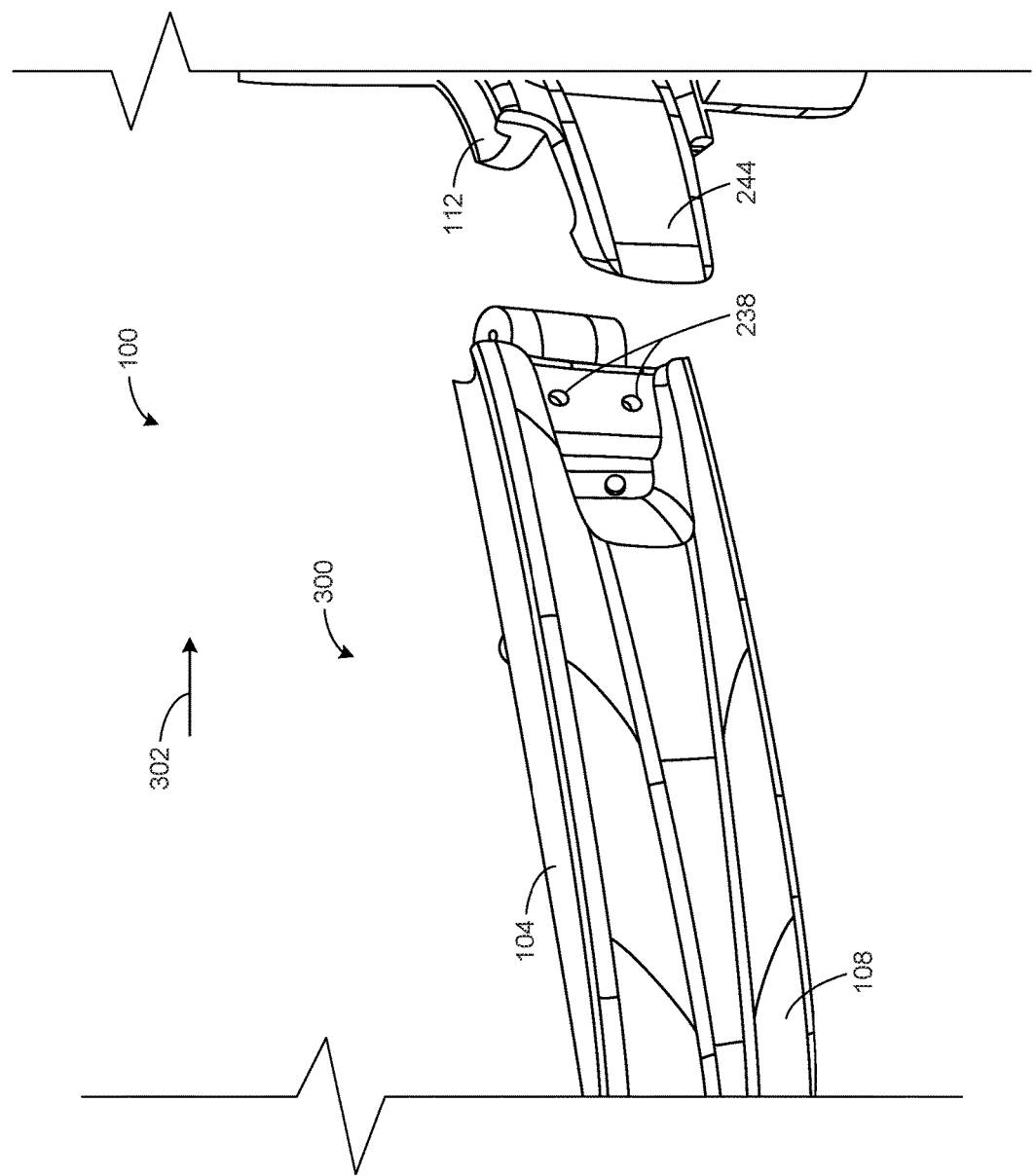
FIGS. 3-5 are partial assembled, perspective views of the example of the example head-worn display of FIGS. 1A, 1B, 2A and 2B.
Figure 4:
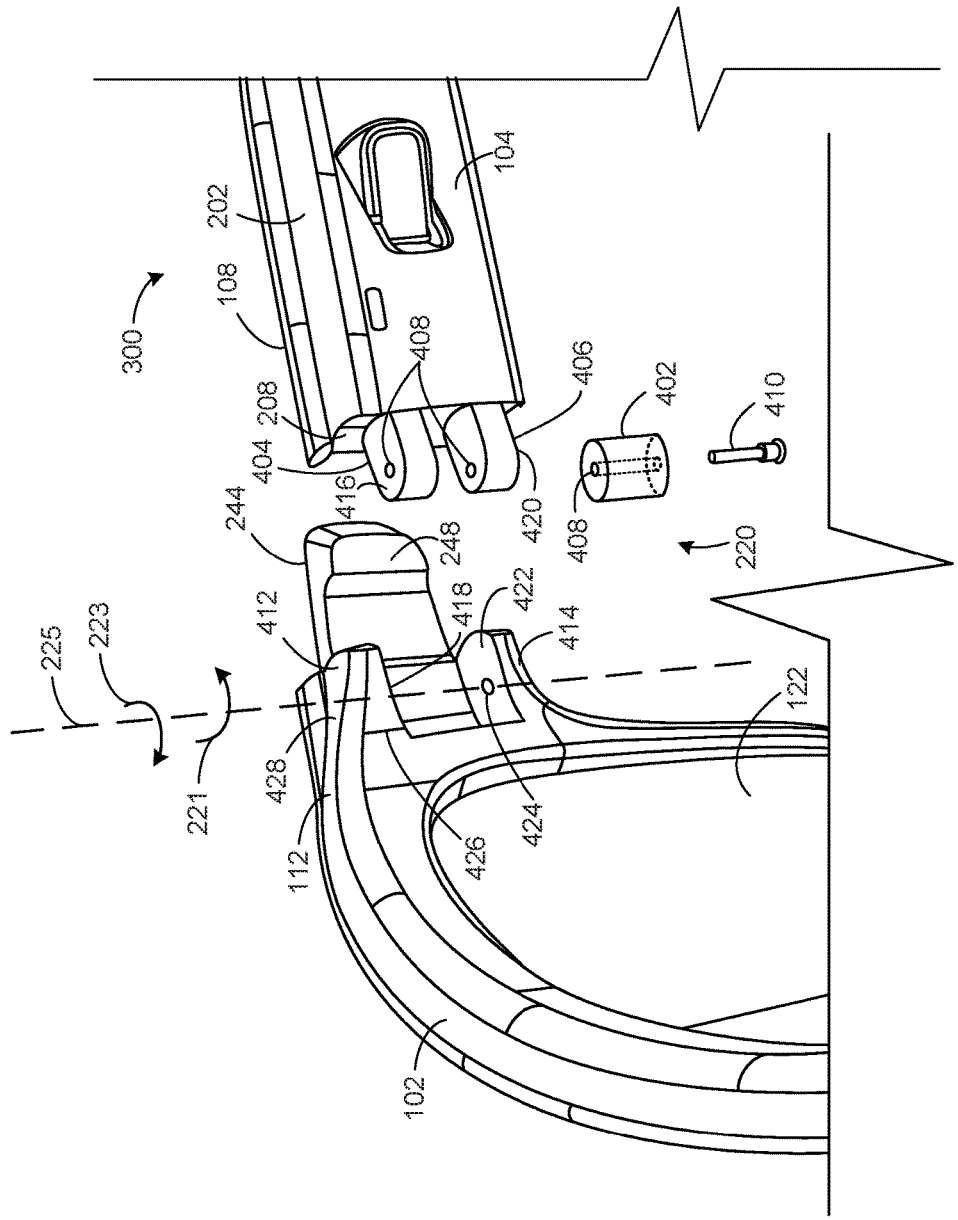
Figure 5:
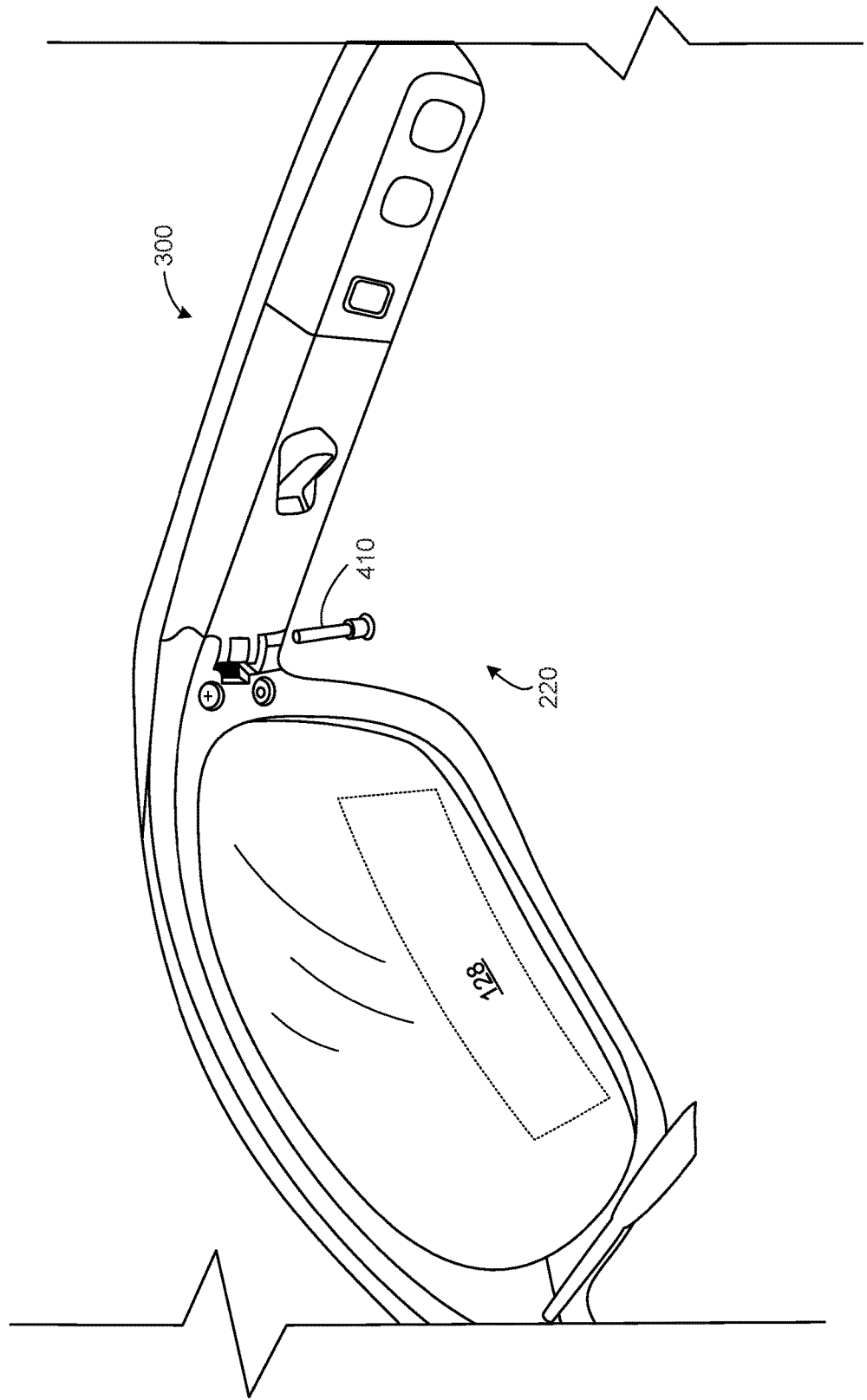

FIGS. 3-5 are partially assembled, perspective views of the example of the head-worn display apparatus 100 of FIGS. 1A, 1B, 2A and 2B. FIG. 3 illustrates the first stem 108 coupled to the housing 202 to form a first stem and housing subassembly 300. To couple the first stem 108 to the housing 202, the knob 232 of the first stem 108 is positioned in the track 236 and slide in a direction 302 toward the frame 102 (e.g., the frame tab 244) until the knob 232 engages to the retainer 234. When the openings 238 of the first stem 108 align with the openings 240 of the housing 202, the fasteners 230 are positioned in the openings 238 and 240 to couple the first end 226 of the first stem 108 to the housing 202. In some examples, the first stem 108 of the illustrated example couples to the housing 202 prior to coupling the housing 202 to the frame 102.

Referring to FIG. 4, the first stem and housing subassembly 300 of the illustrated example is then attached to the first side 112 of the frame 102 via the hinge 220. To provide the hinge 220, the first end 208 of the housing 202 of the illustrated example includes a hinge member 402 positioned between an upper arm 404 and a lower arm 406 adjacent (e.g., protruding from) the first end 208 of the housing 202. In the illustrated example, the hinge member 402 is a bushing. In some examples, the hinge member 402 may be a hinge knuckle and/or any other structure that enables rotation of the housing 202 relative to the frame 102. In the illustrated example, the upper arm 404 and the lower arm 406 are integrally formed with the housing 202 (e.g., via injection molding). The hinge member 402 of the illustrated example is supported (e.g., coupled) between the upper arm 404 and the lower arm 406. The hinge member 402, the upper arm 404 and the lower arm 406 include apertures 408 to receive a fastener or hinge pin 410.

The receive the hinge member 402, the first side 112 of the frame 102 of the illustrated example includes a hinge-receiving portion adjacent the first lens 122 and/or the first side 112 of the frame 102. The hinge-receiving portion of the illustrated example includes an upper support 412 (e.g., a shoulder or wall) and a lower support 414 (e.g., a shoulder or wall) spaced from the upper support 412. In the illustrated example, the upper support 412 and the lower support 414 of the illustrated example define a space or area therebetween (e.g., a vertical space) to receive the hinge member 402, the upper arm 404 and the lower arm 406 of the housing 202. For example, an upper surface 416 of the upper arm 404 engages a lower surface 418 of the upper support 412 and a lower surface 420 of the lower arm 406 engages an upper surface 422 of the lower support 414 when the housing 202 is coupled to the first side 112 of the frame 102. In some examples, the upper support 412 and/or the lower support 414 may be positioned between upper arm 404 and/or the lower arm 406 of the housing 202.

In the illustrated example, the lower support 414 includes an opening 424 that aligns with the apertures 408 to receive the hinge pin 410. The upper support 412 of the illustrated example includes a recessed opening 426 (e.g., a threaded opening) that partially extends through the upper support 412. The opening 426 of the upper support 412 of the illustrated example does not extend through an upper surface 428 of the upper support 412 and/or frame 102. To receive or fasten the hinge pin 410 to the frame 102, the hinge pin 410 of the illustrated example may be coupled to the upper support 412 and/or the lower support 414 via threads, snap-fit, interference fit, and/or any other type of connection(s).

Referring to FIG. 5, the hinge pin 410 is positioned through the lower support 414, the lower arm 406, the hinge member 402, the upper arm 404, and the upper support 412 to pivotally attach the first stem and housing subassembly 300 to the first side 112 of the frame 102. In some examples, the hinge 220 of the illustrated example may be a ball joint and/or any other joint or structure that enables rotation of the first stem 108 and/or the housing 202 relative to the frame 102.

Figure 6:
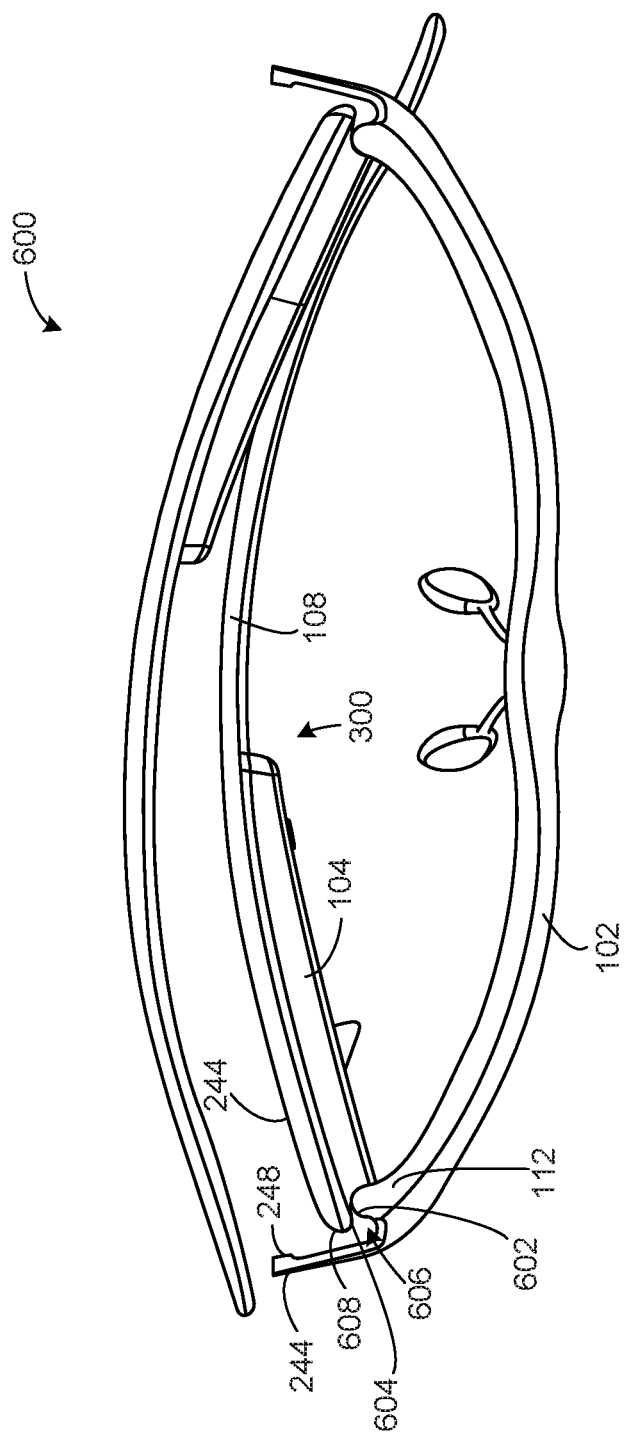
FIG. 6 is a top view of the example head-worn display apparatus of FIGS. 1A and 1B shown in a non-use position.

FIG. 6 is a top view of the head-worn display apparatus 100 shown in a stored position or non-use position 600. In the non-use position 600, the frame tab 244 of the illustrated example disengages decouples, or detaches from the first stem 108 (e.g., from the cavity 254 and/or the outer surface 224 of the first stem 108). The first side 112 of the frame 102 (e.g., the upper support 412 and/or the lower support 414 of the frame tab 244) of the illustrated example defines a contoured shape or edge 602 and the first stem and housing subassembly 300 (e.g., the first end 208 of the housing 202 and/or the first end 226 of the first stem 108) defines a contoured surface or edge 604. Specifically, the contoured edges 602 and 604 guide the rotational movement of the first stem and housing subassembly 300 between the non-use position 600 shown in FIG. 6 and the use position 101 shown in FIGS. 1A and 1B. For example, the frame tab 244 and the first side 112 of the frame 102 of the illustrated example form a gap 606 to receive a leading edge 608 of the first stem and housing subassembly 300.

Figure 7:
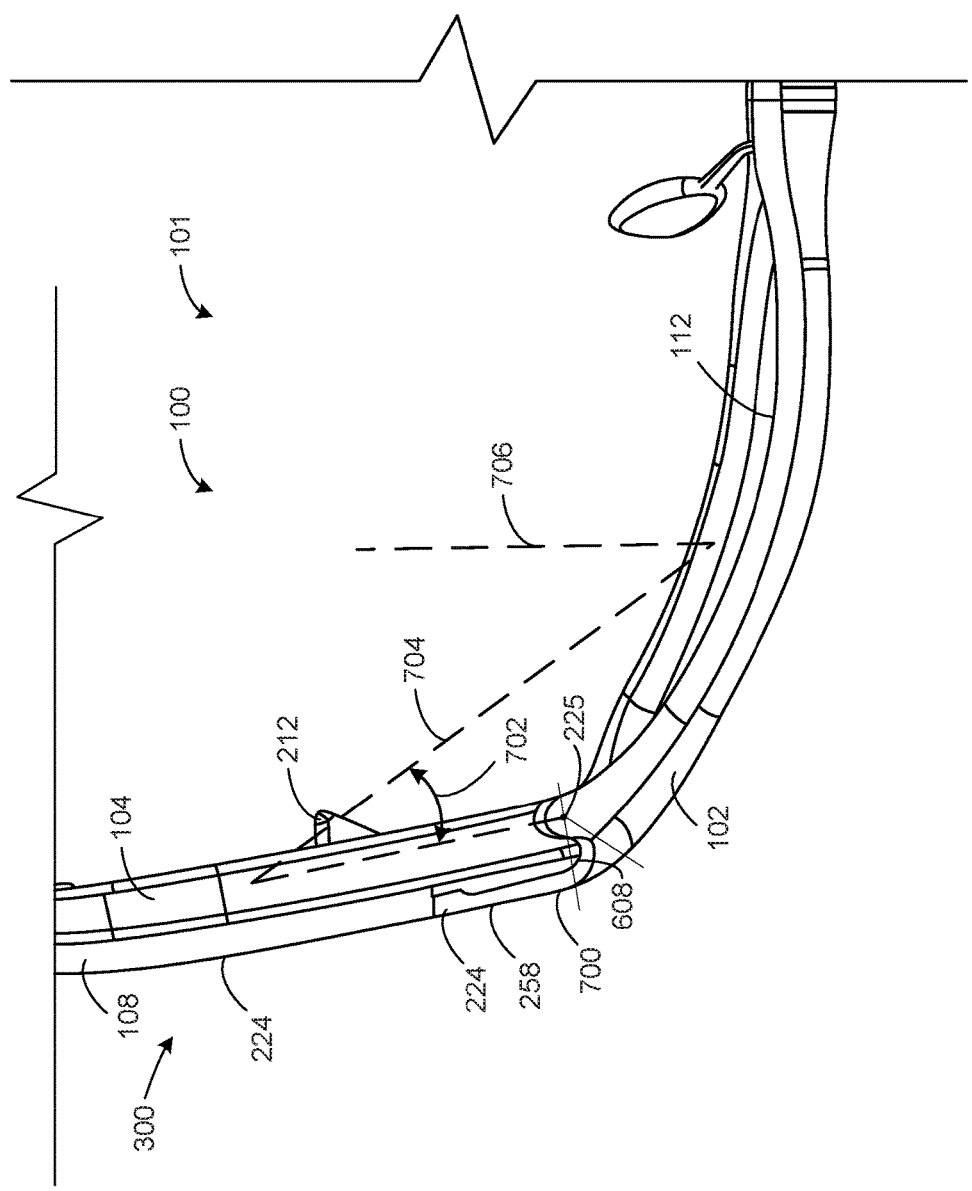
FIG. 7 is a partial, top view of the example head-worn display apparatus of FIGS. 1A and 1B shown in a use position.

FIG. 7 is a top, partial view of the head-worn display apparatus 100 in the use position 101. In the use position 101, an outer surface 700 of the frame tab 244 of the illustrated example is flush relative to the outer surface 224 of the first stem 108 when the recessed cavity 254 receives the frame tab 244. In other words, the outer surface 700 of the frame tab 244 and the outer surface 224 of the first stem 108 form a continuous outer surface (e.g., a smooth surface without steps, etc.). However, in some examples, the outer surface 224 of the first stem 108 and/or the outer surface 256 of the frame tab 244 may be offset or provide a step feature (e.g., may be offset).

In the use position 101, an angle 702 between the image source 212 and the pivot axis 225 is provided to enable alignment between a projection 704 (e.g., a line-of-sight) of the image source 212 and a central reference 706 of the reflective material 128. Although the leading edge 608 is positioned in the gap 606 and may engage the frame tab 244 and/or the frame 102 to restrict or prevent rotation of the first stem and housing subassembly 300 in the first rotational direction 221 when in the use position 101, manufacturing tolerances may cause improper alignment between the projection 704 of the image source 212 and the central reference 706 of the reflective material 128. For example, in some instances, manufacturing tolerances between the contoured edges 602 and 604, the frame 102, the housing 202 and/or the first stem 108 may cause a rotational position of the image source 212 provided by the angle 702 to be off-center relative to the reflective material 128. For example, such misalignment may cause the projection 704 of the image source 212 to be offset relative to the central reference 706 by approximately between, for example, 1 and 2 degrees when the head-worn display apparatus 100 is in the use position 101. Such misalignment may reduce performance characteristic(s) of the head-worn display apparatus 100.

To improve location of a rotational position of the image generator 104 relative to the frame 102 when the head-worn display apparatus 100 is in the use position 101 (e.g., improve manufacturing tolerances), the head-worn display apparatus 100 of the illustrated example employs the position locator 242. For example, the position locator 242 more accurately or precisely locates the image source 212 of the image generator 104 relative to the reflective material 128 of the first lens 122 when the head-worn display apparatus 100 is in the use position 101. For example, the position locator 242 of the illustrated example provides precise location or alignment between (e.g., the projection 704 of) the image source 212 relative to (e.g., the central reference 706) the reflective material 128 irrespective of the manufacturing variations or tolerances noted above. For example, the position locator 242 of the illustrated example may locate the image source 212 relative to the frame 102 at the angle 702 such that the projection 704 of the image source 212 is within approximately 0.1 degree of the central reference 706 of the reflective material 128.

Although the head-worn display apparatus 100 of the illustrated example employs the position locator 242, in some examples, the head-worn display apparatus 100 may not include the position locator 242. Instead, the tolerance between the frame tab 244 and the leading edge 608 and the gap 606 may be configured to provide precise location or alignment between (e.g., the projection 704 of) the image source 212 relative to (e.g., the central reference 706)

Figure 8:
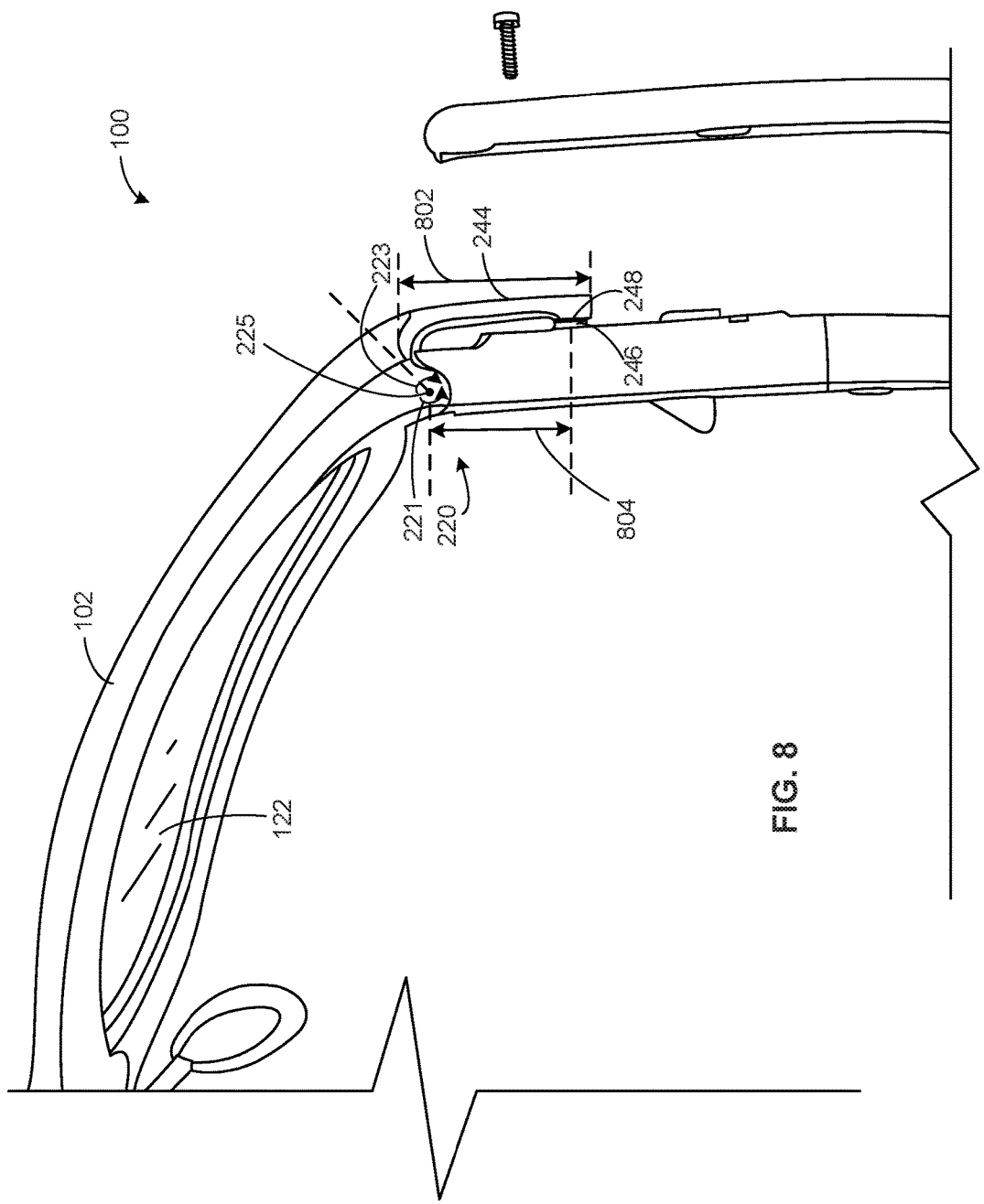
FIG. 8 is a partially assembled, top view of the example head-worn display apparatus of FIG. 7.

FIG. 8 is a partially assembled, top view of the head-worn display apparatus 100 of FIG. 7. In particular, FIG. 8 is a view similar to FIG. 7 but showing the first stem 108 removed from the housing 202 to more clearly illustrated the position locator 242 when the head-worn display apparatus 100 is in the use position 101. More specifically, the lip 248 of the frame tab 244 engages the touch-off tab 246 of the housing 202. Thus, the touch-off tab 246 engages the lip 248 provide an interference that prevents further rotation of the first stem and housing subassembly 300 in the first rotational direction 221 relative to the pivot axis 225 of the hinge 220 when the head-worn display apparatus 100 is in the use position 101. The location of the image generator 104 and/or the image source 212 when the head-worn display apparatus 100 of the illustrated example is in the use position 101 is provided or controlled by a length 802 of the frame tab 244 relative to the frame 102 and/or a length 804 of a location of the touch-off tab 246 on the housing 202 relative to the pivot axis 225. In some examples, the length 802 of the frame tab and/or the length 804 of the touch-off tab 246 relative to the pivot axis 225 may be approximately between 1.2 and 1.5 millimeters. In some examples, a dimensional characteristic (e.g., a dimensional protruding distance or thickness) of the touch-off tab 246 relative to the outer surface 206 of the housing 202 and/or a dimensional characteristic (e.g., a dimensional thickness) of the lip 248 relative to the inner surface 252 of the frame tab 244 may be between approximately 0.25 and 1.0 millimeters.

In some examples, dimensional characteristic(s) (e.g., a length and/or protruding thickness) of the frame tab 244 (e.g., the length 802), the lip 248 and/or the touch-off tab 246 may be varied (e.g., increased or decreased) to properly or accurately a location of a rotational position of the image generator 104 or the image source 212 relative to the frame 102 and/or the central reference 706 of the reflective material 128 when the head-worn display apparatus 100 is in the use position 101.

In some examples, the touch-off tab 246 may be formed on the lip 248 and/or the inner surface 252 of the frame tab 244 instead of and/or in addition to the outer surface 224 of the first stem 108. In some examples, the lip 248 may be formed on the outer surface 224 of the first stem 108. In some examples, the lip 248 and/or the inner surface 252 of the frame tab 244 may include a recess or cavity to receive the touch-off tab 246 of the first stem 108 when the first stem 108 engages the frame tab 244 (e.g., in the use position 101). As noted above, some examples head-worn display apparatus may not include the position locator 242.

Figure 9:
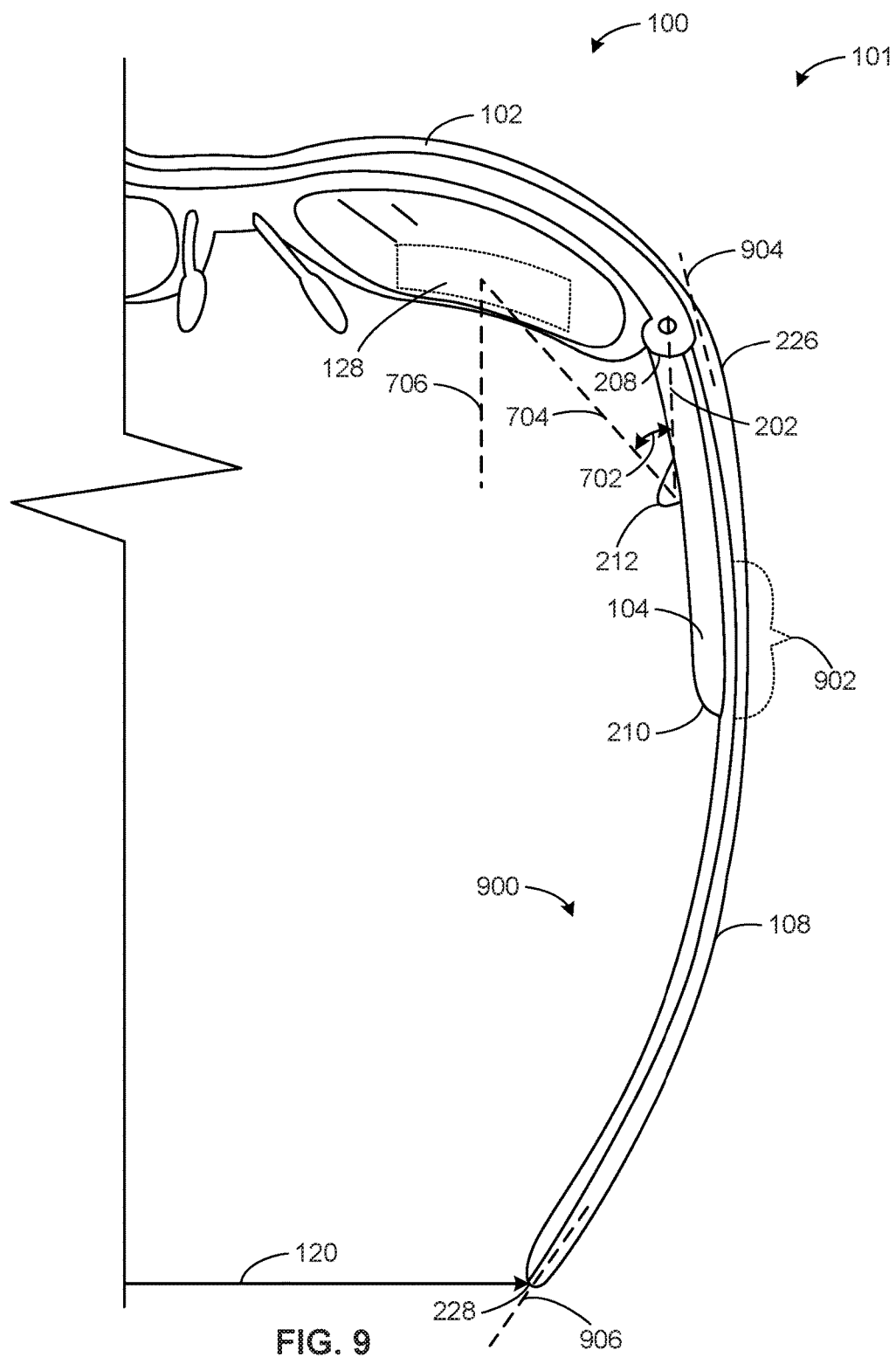
FIG. 9 is a top view of a portion of the example head-worn display apparatus of FIGS. 1A and 1B shown in the use position, and a first stem of the example head-worn display apparatus shown in a non-flexed condition or state.

FIG. 9 is a top, partial view of the head-worn display apparatus 100 shown in the use position and the first stem 108 shown in a non-flexed state or non-flexed condition 900 (e.g., a non-flexed position). In the non-flexed condition 900, at least a portion 902 of the first stem 108 between the first end 208 of the housing 202 and the second end 210 of the housing 202 may be in contact (e.g., direct contact) with the outer surface 206 of the housing 202 of the image generator 104. In the illustrated example, the non-flexed condition 900 of the first stem 108 provides the dimensional characteristic 120 to accommodate a first sized head of a user. For example, the non-flexed condition 900 accommodates a smallest size of a range of sizes.

To provide a spring-effect or force against a head of a user when the user wears the head-worn display apparatus 100, the first stem 108 of the illustrated example includes an arcuate profile along a longitudinal length of the first stem 108. For example, a longitudinal axis 904 defined at the first end 226 of the first stem 108 is offset or non-parallel relative to (e.g., intersects) a longitudinal axis 906 at the second end 228 (e.g., an ear piece) of the first stem 108. Such arcuate profile improves user comfort.

Figure 10:
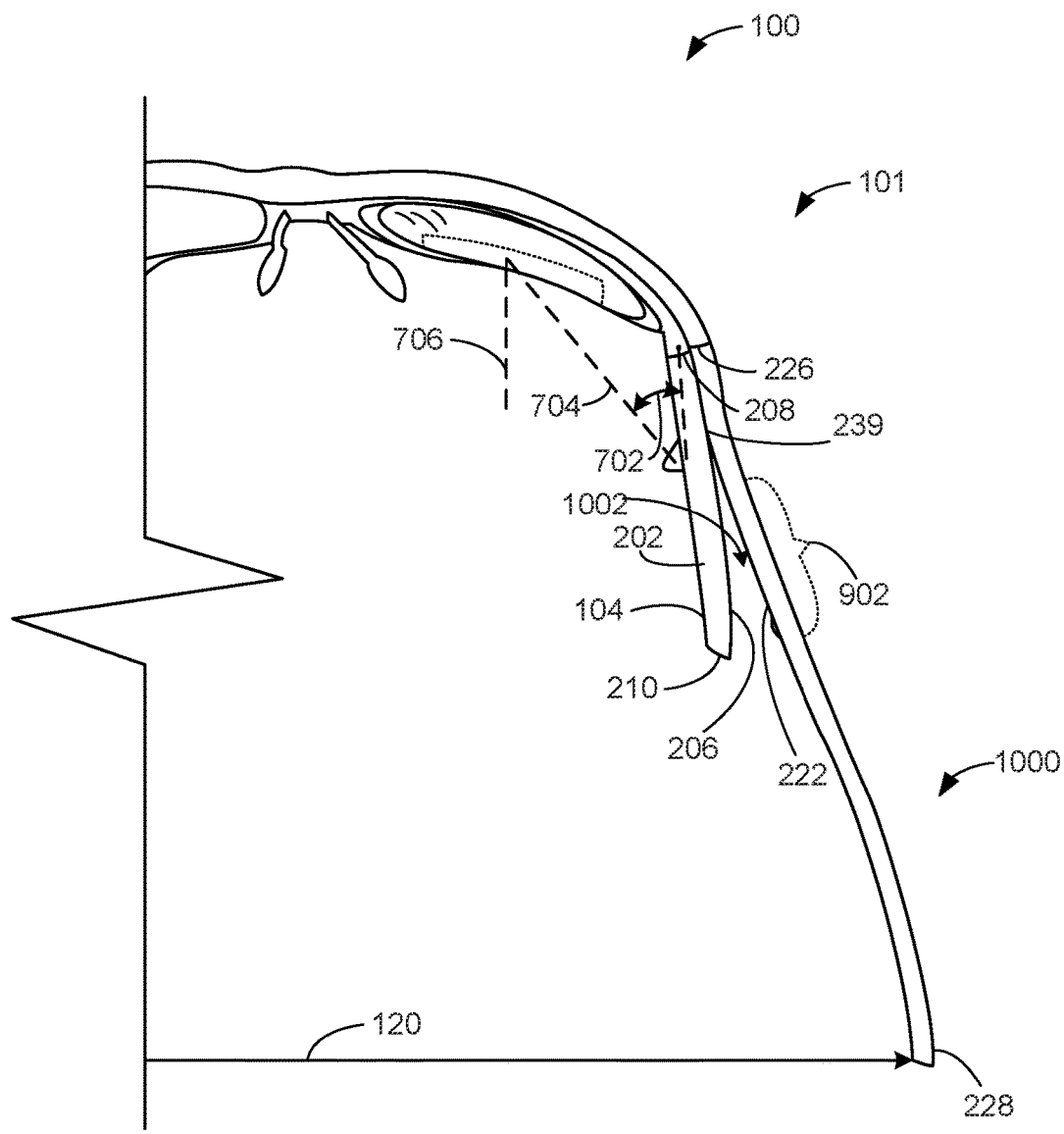
FIG. 10 is a top view of a portion of the example head-worn display apparatus of FIGS. 1A and 1B shown in the use position, and the example first stem shown in a flexed condition or state.

FIG. 10 is a top, partial view the head-worn display apparatus 100 shown in the use position 101 and the first stem 108 shown in a flexed state or condition 1000 (e.g., a flexed position). To accommodate different sized heads and enable the head-worn display apparatus 100 to comfortably fit a head of a user, the first stem 108 of the illustrated example moves or flexes relative to the image generator 104 and/or the frame 102 between the non-flexed condition 900 shown in FIG. 9 and the flexed condition 1000 shown in FIG. 10. For example, the flexed condition 1000 of the first stem 108 increases the dimensional characteristic 120 (e.g., the distance between the ends of the first stem 108 and the second stem 110) to accommodate a second sized head of a user, where the second sized head is larger than the first sized head. For example, the flexed condition 1000 of the illustrated example may accommodate a largest size in a range different sized users. In some examples, in the use, non-flexed condition 900, the dimensional characteristic 120 may be between approximately 6 inches and 10 inches (e.g., 7 inches), and in the use, flexed condition 1000, the dimensional characteristic 120 may be between approximately 9 inches and 13 inches (e.g., 9 inches). In some examples, the flexed condition 1000 increases the dimensional characteristic 120 by between approximately 1 inch and 5 inches.

To move the first stem 108 to the flexed condition 1000, the second end 228 of the first stem 108 moves or flexes relative to the first end 226 of the first stem 108. Movement of the first stem 108 from the non-flexed condition 900 to the flexed condition 1000 does not alter the alignment between the projection 704 of the image source 212 relative to the central reference 706 of the reflective material 128.

To prevent the first stem 108 from altering an alignment between the projection 704 of the image source 212 relative to the central reference 706 of the reflective material 128 when the first stem 108 flexes relative the housing 202 of the image generator 104, the portion 902 of the first stem 108 of the illustrated example moves away from the housing 202 of the image generator 104 (e.g., operatively or effectively decouples or detaches from the image generator 104).

More specifically, the inner surface 222 of the portion 902 of the first stem 108 positioned between the first end 208 and the second end 210 of the housing 202 moves away or detaches from the outer surface 206 of the housing 202 of the image generator 104 (e.g., when the first stem 108 flexes or moves about the first end 226 and/or the flex point 239). In the illustrated example, a gap 1002 forms (e.g., is created) between the inner surface 222 of the portion 902 of the first stem 108 and the outer surface 206 of the housing 202 when the second end 228 of the first stem 108 moves or flexes relative to the first end 226 and/or the flex point 239. In contrast, for example, the gap 1002 between the inner surface 222 and the outer surface 206 is closed (e.g., eliminated) when the first stem 108 is in the non-flexed condition 900 of FIG. 9. Although the portion 902 of the first stem 108 moves away from or detaches from the outer surface 206 of the housing 202 (e.g., forms the gap 1002), the fasteners 230 and/or the engagement between the knob 232 and the retainer 234 maintain the first end 226 of the first stem 108 attached to the housing 202.

Additionally, the first connection 114 of the illustrated example maintains a fixed relationship between the frame 102 and the image generator 104 (e.g., in a vertical direction and a horizontal direction) when the first stem 108 moves to the flexed condition 1000 while the image source 212 is in the use position. Additionally, the position locator 242 of the illustrated example maintains the angle 702 of the image source 212 relative to the pivot axis 225 by preventing or restricting rotation of the image generator 104 in the first rotational direction 221 when the first stem 108 flexes or moves to the flexed condition 1000. In other words, the alignment (e.g., the line-of-sight) of the projection 704 of the image source 212 relative to the central reference 706 is maintained when the first stem 108 moves between the non-flexed condition 900 and the flexed condition 1000.

Although not shown, the second stem 110 of the head-worn display apparatus 100 of the illustrated example flexes relative to the power source 106 in a similar manner as the first stem 108 flexes relative to the image generator 104. Enabling a proper fit for a user wearing the head-worn display apparatus 100 of the illustrated example enables a user to comfortably wear example head-worn display apparatus disclosed herein for extended periods of time (e.g., at least for several hours).

The frame 102 and the housing 202 of the illustrated example may be formed of any suitable material, including, for example, plastic, a rubber, a rubber coated core material, such as metal or plastic, titanium, aluminum, a rigid material such as fiber-reinforced material (e.g., a carbon fiber composite) and/or any other suitable material(s) and/or any combinations thereof. The first stem 108 and/or the second stem 110 of the illustrated example may be formed of a flexible, resilient material, such as titanium, aluminum, plastic, and/or any other suitable material(s) and/or combinations thereof.

Figure 11:
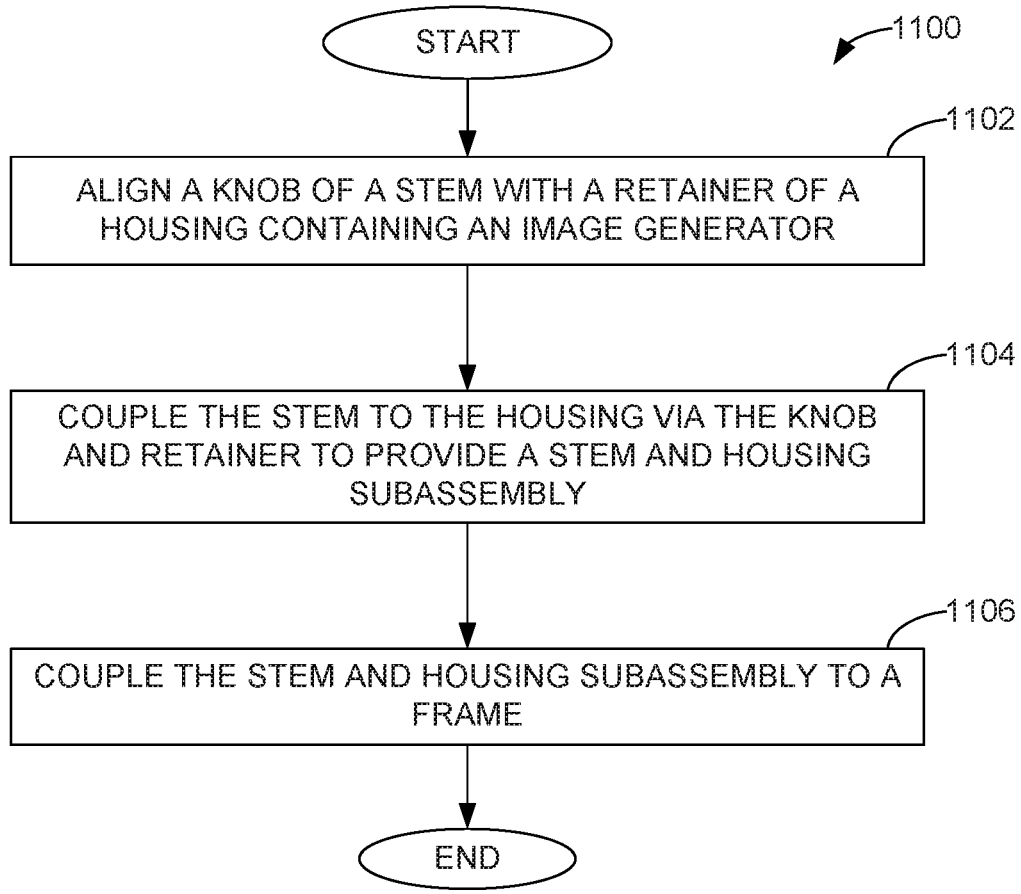
FIG. 11 is a flowchart of an example method 1100 that may be used to manufacture an example head-worn display apparatus disclosed herein.

FIG. 11 is a flowchart of an example method 1100 that may be used to manufacture an example head-worn display apparatus such as the head-worn display apparatus 100 of FIGS. 1A and 1B. While an example manner of assembling the head-worn display apparatus 100 has been illustrated in FIG. 11, one or more of the steps and/or processes illustrated in FIG. 11 may be combined, divided, re-arranged, omitted, eliminated and/or implemented in any other way. Further still, the example method of FIG. 11 may include one or more processes and/or steps in addition to, or instead of, those illustrated in FIG. 11, and/or may include more than one of any or all of the illustrated processes and/or steps. Further, although the example method is described with reference to the flow chart illustrated in FIG. 11, many other methods of assembling the head-worn display apparatus 100 of FIGS. 1A and 1B may alternatively be used.

To begin the example assembly process of FIG. 11, a knob (e.g., the knob 232) of a stem (e.g., the first stem 108) is coupled to a housing (e.g., the housing 202) (block 1102). For example, the knob 232 of the first stem 108 is aligned with the track 236 formed on the outer surface 206 of the housing 202 of the image generator 104. Similarly, a knob of second stem 110 is coupled to a track formed on an outer surface of a housing of the power source 106.

The stem is coupled to the housing via the knob and retainer to provide a stem and housing subassembly (block 1104). For example, to couple the first stem 108 to the housing 202 to provide the stem and housing subassembly 300, the knob 232 of the first stem 108 couples to the retainer 234 via the track 236. For example, the knob 232 of the head-worn display apparatus 100 is slide in the track 236 until the knob 232 engages the retainer 234. In some examples, the knob 232 couples to the outer surface 206 of the housing via a snap-fit connection. For example, in some such examples, the knob 232 may be coupled to the retainer via snap-fit connection without use of the track 236. For example, the snap-fit connection may be provided via a ball and joint connection, a clip (e.g., a double-prong clip and slot interface connection), a fastener (e.g., a screw) and/or any other connection(s). In some examples, after the knob is coupled to the housing, the stem may be secured to the housing via a mechanical fastener (e.g., a screw, a snap-fit, a rivet, etc.), a chemical fastener (e.g., adhesive, etc.) and/or any other fastener(s). For example, the first end 226 of the first stem 108 is fastened to the housing 202 via the fasteners 230.

The stem and housing subassembly 300 is then coupled to a frame (block 1106). For example, the stem and housing subassembly may be coupled to the frame via a hinge. For example, the stem and housing subassembly 300 is coupled to the frame 102 via the hinge 220. The hinge 220 may include the hinge member 402 and the hinge pin 410. In some examples, the hinge 220 may be implemented with a ball joint connection and/or any other connection to enable the stem and housing subassembly 300 to pivot relative to the frame 102. In some examples, the hinge 220 cantilevers the stem and housing subassembly 300 relative to the frame 102. In some examples, the position locator 242 may be positioned on the outer surface 206 of the housing 202. For example, in some examples, the touch-off tab 246 may be coupled to the outer surface 206 using a mechanical fastener (e.g., a screw), a chemical fastener (e.g., adhesive, plastic weld, etc.) and/or may be otherwise formed on the outer surface 206 via machining, injection molding and/or any other manufacturing technique(s).

The head-worn display apparatus 100 of the illustrated example provides a head mounted display or head-worn display that may be worn by a user. For example, the head-worn display apparatus 100 of the illustrated example provides partially-augmented virtual reality imagery.

In some examples, the head-worn display apparatus 100 of the illustrated example may be configured to provide fully-augmented virtual reality imagery where the outside or environment view is fully blocked to a user when the image source 212 projects imagery to the lenses during use of the head-worn display apparatus 100.

In some such examples, the head-worn display apparatus 100 of the illustrated example may be used as conventional glasses when the image source 212 is not projecting digital imagery, a partially-augmented reality when the image source 212 presents digital imagery across a portion of the lens (e.g., the first lens) to allow a user to see the environment through the lens while also seeing, simultaneously, the digital imagery, and/or a fully-augmented reality when the image source 212 presents digital imagery across an entire portion of the first lens 122 and the second lens 124 (or a unitary lens) and blocks viewing of the surrounding environment through the first lens 122 and the second lens 124. For example, to configure the head-worn display apparatus 100 for use in a fully-augmented reality application, a cover may be positioned on an outer surface of the frame 102 that blocks light in the surrounding environment from passing through the lens or to a user's eyes. In some such examples, the cover may be removably attached (e.g., via snap-fit connection) to enable dual functionality of head-worn device apparatus for use as fully and partially augmented reality applications.

In some examples, the image source 212 and/or the head-worn display apparatus 100 may be configured to project or overlay digital imagery across both the first lens and the second lens. In some such examples, the head-worn display apparatus 100 may be configured with a unitary lens (e.g., one-piece glass or lens) and the image source may project digital imagery across at least a portion of the unitary lens.

In some examples, the example head-worn display of the illustrated example may include the image source 212 to project an image on the first lens 122 and a second image source to project a second image on the second lens. In some examples, the first image may be the same as the second image. However, in some examples, the first image may be different than the second image. In some such examples, the head-worn display apparatus 100 may be employed by a user when using the head-worn display apparatus 100 for virtual reality applications.

Example wearable device or head-worn display apparatus having flexible stems are disclosed. Further examples and combinations thereof include the following.

Example 1 may be a wearable device or head-worn display apparatus, including a frame to support a lens; a housing having an image generator, the housing to couple the image generator coupled to the frame, the image generator to project an image adjacent the lens; and a stem having a first end and a second end, the first end of the stem to couple to the housing of the image generator and the second end of the stem to project from the image generator, the stem having a non-flexed position and a flexed position, at least a portion of the stem between the first end and the second end is to move relative to the housing of the image generator when the stem moves between the non-flexed position and the flexed position while a position of the image generator remains in a fixed relationship relative to the frame.

Example 2 includes the head-worn display apparatus of example 1, wherein the at least the portion of the stem is to move away from the housing of the image generator when the stem is in the flexed position.

Example 3 includes the head-worn display apparatus as defined in any one of examples 1-2, wherein the stem does not cause the image generator to move relative to the frame when the stem moves between the non-flexed position and the flexed position.

Example 4 includes the head-worn display apparatus of as defined in any one of examples 1-3, wherein the housing of the image generator is pivotally coupled to the frame to enable the image generator to move relative to the frame between a stored position and a use position.

Example 5 includes the head-worn display apparatus as defined in any one of examples 1-4, wherein the image provided by the image generator is to align with a central reference of the lens.

Example 6 includes the head-worn display apparatus as defined in any one of examples 1-5, wherein movement of the stem between the non-flexed position and the flexed position does not affect an alignment of the image relative to the central reference of the lens.

Example 7 includes the head-worn display apparatus as defined in any one of examples 1-6, further including a position locator including a protrusion formed on an outer surface of the housing and a frame tab projecting from the frame, the position locator to align a projection of the image generator relative to the central reference of the lens when the housing rotates to a use position and the image generator projects the image toward the lens.

Example 8 includes the head-worn display apparatus as defined in any one of examples 1-7, wherein the image generator is pivotally coupled to the frame via a hinge.

Example 9 includes the head-worn display apparatus as defined in any one of examples 1-8, wherein the first end of the stem is attached to an outer surface of the housing via a fastener.

Example 10 includes the head-worn display apparatus as defined in any one of examples 1-9, wherein the first end of the stem includes knob and an outer surface of the housing of the image generator includes a track and a retainer, the knob is to engage the retainer via the track to couple the first end of the stem to the housing of the image generator.

Example 11 includes the head-worn display apparatus as defined in any one of examples 1-10, wherein the stem moves is to move relative to the outer surface of the housing relative to a flex point provided by the knob and the retainer.

Example 12 is an example of a wearable device or a head-worn display apparatus including a housing cantilevered from the frame, the housing to support an image source that is to project an image adjacent the lens; and a stem having a first end fixed to the housing and a second end projecting freely relative to the first end, the second end to flex relative to the first end, at least a portion of the stem adjacent the housing is to move away from the housing when the second end is to flex relative to the first end.

Example 13 includes the head-worn display apparatus of example 12, wherein the stem is to move away from the housing to prevent movement of the stem from changing a position of the image source relative to the frame when the second end is to flex relative to the first end.

Example 14 includes the head-worn display apparatus as defined in any one of examples 12-13, wherein a first portion of the stem and a second portion of the stem positioned along the housing are to engage the housing when the stem is in a non-flexed condition relative to the housing.

Example 15 includes the head-worn display apparatus as defined in any one of examples 12-14, wherein a first portion of the stem positioned along the housing is to engage the housing and a second portion of the stem positioned along the housing is to disengage the housing when the stem is to flex relative to the housing.

Example 16 includes the head-worn display apparatus as defined in any one of examples 12-15, a position locator including a protrusion formed on an outer surface of the stem and a lip formed on an inner surface of a frame tab projecting from the frame, the position locator to align the image source relative to a central reference of the lens when the housing rotates to a use position and the image source projects the image toward the lens.

Example 17 is an example head-worn display apparatus including a frame to support a lens, the frame defining a hinge-receiving portion adjacent the lens; an image source coupled to the frame adjacent the lens, the image source having a housing defining a longitudinal length between a first end and a second end opposite the first end, the first end including a hinge to couple to the hinge-receiving portion of the frame, the image source to rotate relative to the frame between a stored position and a use position; and a position locator to align a projection of the image source relative to a central reference of the lens when the image source rotates to the use position.

Example 18 includes the head-worn display apparatus of examples 17, further including a stem coupled to the frame via the housing of the image source, only a first portion adjacent a first end of the stem being fixed to an outer surface of the housing and a second end of the stem opposite the first end to project freely relative to the first end.

Example 19 includes the head-worn display apparatus as defined in any one of examples 17-18, wherein the second end of the stem is to move relative to the first end of the stem, at least a second portion of the stem adjacent the at least the first portion of the stem is to move away from the outer surface of the housing when the second end of the stem moves relative to the first end of the stem while the at least the first portion adjacent the first end of the stem remains engaged with the outer surface of the housing.

Example 20 includes the head-worn display apparatus as defined in any one of examples 17-19, wherein the at least the second portion of the stem adjacent the at least the first portion of the stem is to engage the outer surface of the housing when the second end of the stem is in a non-flexed condition or state relative to the first end.

Example 21 includes the head-worn display apparatus as defined in any one of examples 17-20, wherein the position locator maintains a position of the housing fixed relative to the frame when the second end of the stem moves relative to the first end in a direction away from the housing.

Example 22 is a method of assembling a wearable device or a head-worn display apparatus including aligning a knob of a stem with a retainer of a housing containing an image generator; coupling the stem to the housing via the knob and the retainer to provide a stem and housing subassembly; and coupling the stem and housing subassembly to a frame.

Example 23 includes the method of example 22, wherein coupling the stem to the housing via the knob and the retainer includes aligning the knob with a track of the housing and sliding the stem relative to the housing to engage the knob and the retainer.

Example 24 includes the method as defined in any one of examples 22-23, further including a hinge to couple the stem and housing subassembly to the frame.

Example 25 includes the method as defined in any one of examples 22-24, further including positioning a bushing between an upper arm and a lower arm of the housing defining a portion of the hinge.

Example 26 includes the method as defined in any one of examples 22-25, wherein positioning a hinge pin through openings of the bushing, the upper arm, the lower arm and the frame.

Example 27 includes an example head-worn display apparatus including a frame to support a lens; a housing having an image generator, the housing to couple the image generator coupled to the frame, the image generator to project an image adjacent the lens; and a stem having a first end and a second end, the first end of the stem to couple to the housing of the image generator and the second end of the stem to project from the image generator, the stem having a non-flexed position and a flexed position, at least a portion of the stem between the first end and the second end is to move relative to the housing of the image generator when the stem moves between the non-flexed position and the flexed position while a position of the image generator remains in a fixed relationship relative to the frame.

Example 28 includes the head-worn display apparatus as defined in the example 27, wherein the at least the portion of the stem is to move away from the housing of the image generator when the stem is in the flexed position.

Example 29 includes the head-worn display apparatus as defined in any one of examples 27-28, wherein the stem does not cause the image generator to move relative to the frame when the stem moves between the non-flexed position and the flexed position.

Example 30 includes the head-worn display apparatus as defined in any one of examples 27-29, wherein the image provided by the image generator is to align with a central reference of the lens, and wherein movement of the stem between the non-flexed position and the flexed position does not affect an alignment of the image relative to the central reference of the lens.

Example 31 includes the head-worn display apparatus as defined in any one of examples 27-30, further including a position locator to align a projection of the image generator relative to the central reference of the lens when the housing rotates to a use position and the image generator projects the image toward the lens.

Example 32 includes the head-worn display apparatus as defined in any one of examples 27-31, wherein the position locator includes a protrusion formed on an outer surface of the stem and a lip formed on an inner surface of a frame tab projecting from the frame.

Example 33 includes the head-worn display apparatus as defined in any one of examples 27-32, wherein the image generator is pivotally coupled to the frame via a hinge.

Example 34 includes the head-worn display apparatus as defined in any one of examples 27-33, wherein the first end of the stem is attached to an outer surface of the housing via a fastener, and/or, wherein the first end of the stem includes knob and an outer surface of the housing of the image generator includes a track and a retainer, the knob is to engage the retainer via the track to couple the first end of the stem to the housing of the image generator.

Example 35 includes the head-worn display apparatus as defined in any one of examples 27-34, wherein the stem moves is to move relative to the outer surface of the housing relative to a flex point provided by the knob and the retainer.

Example 36 includes the head-worn display apparatus as defined in any one of examples 27-35, wherein a first portion of the stem and a second portion of the stem positioned along the housing are to engage the housing when the stem is in the non-flexed condition relative to the housing, and/or wherein a first portion of the stem positioned along the housing is to engage the housing and a second portion of the stem positioned along the housing is to disengage the housing when the stem is to flex relative to the housing.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A head-worn display comprising:
   a frame to support a lens;
   a housing having an image generator, the housing to couple the image generator to the frame, the image generator to project an image adjacent the lens; and
   a stem having a first end and a second end, the first end of the stem to couple to the housing of the image generator, the second end of the stem to project from the image generator, the stem having a non-flexed position and a flexed position, at least a portion of the stem between the first end and the second end structured to move away from the housing of the image generator to form a gap between the housing of the image generator and the at least a portion of the stem between the first end and the second end in response to the stem moving from the non-flexed position towards the flexed position, a position of the image generator to remain in a fixed relationship relative to the frame in response to the stem moving between the non-flexed position and the flexed position.

2. The head-worn display of claim 1, wherein the stem does not cause the image generator to move relative to the frame when the stem moves between the non-flexed position and the flexed position.

3. The head-worn display of claim 1, wherein the housing of the image generator is pivotally coupled to the frame to enable the image generator to move relative to the frame between a stored position and a use position.

4. The head-worn display of claim 1, wherein the image provided by the image generator is to align with a central reference of the lens.

5. The head-worn display of claim 4, wherein movement of the stem between the non-flexed position and the flexed position does not affect an alignment of the image relative to the central reference of the lens.

6. The head-worn display of claim 5, further including a position locator including a protrusion formed on an outer surface of the housing and a frame tab projecting from the frame, the position locator to align the image generator to project the image in alignment with the central reference of the lens when the housing is in a use position.

7. The head-worn display of claim 1, wherein the image generator is pivotally coupled to the frame via a hinge.

8. The head-worn display of claim 1, wherein the first end of the stem is attached to an outer surface of the housing via a fastener.

9. The head-worn display of claim 1, wherein the first end of the stem includes knob and an outer surface of the housing of the image generator includes a track and a retainer, the knob to engage the retainer via the track to couple the first end of the stem to the housing of the image generator.

10. The head-worn display of claim 9, wherein the stem moves relative to a flex point provided by the knob and the retainer.

11. A head-worn display comprising:
    a lens;
    a frame to support the lens;
    a housing cantilevered from the frame, the housing to support an image source that is to project an image adjacent the lens; and
    a stem having a first end fixed to the housing and a second end projecting freely relative to the first end, the second end to move relative to the first end, at least a portion of the stem adjacent the housing is structured to move away from the housing to form a gap between the housing and the at least a portion of the stem when the second end moves relative to the first end.

12. The head-worn display of claim 11, wherein the stem is to move away from the housing to prevent movement of the stem from changing a position of the image source relative to the frame when the second end moves relative to the first end.

13. The head-worn display of claim 11, wherein a first portion of the stem and a second portion of the stem positioned along the housing are structured to physically contact the housing when the stem is in a non-flexed condition relative to the housing.

14. The head-worn display of claim 11, further including a position locator including a protrusion on an outer surface of the stem and a lip on an inner surface of a frame tab projecting from the frame, the position locator to align the image source relative to a central reference of the lens when the housing is in a use position.

15. A head-worn display comprising:
a lens;
a frame to support the lens, the frame defining a hinge-receiving portion adjacent the lens;
an image source coupled to the frame adjacent the lens, the image source having a housing defining a longitudinal length between a first end and a second end opposite the first end, the first end of the housing including a hinge to couple to the hinge-receiving portion of the frame, the image source to rotate relative to the frame between a stored position and a use position;
a stem having a first end coupled to the frame via the housing of the image source and a second end opposite the first end projecting freely relative to the first end of the stem, the first end of the stem having at least a first portion fixed to the housing and at least a second portion adjacent the first portion structured to move relative to the housing, wherein the at least the second portion is structured to move away from the housing to form a gap between the at least the second portion and the housing in response to the image source being in the use position and the at least the second portion being in a flexed condition relative to the first end of the stem; and
a position locator projecting from the frame, the position locator to align the image source relative to a central reference of the lens when the image source is in the use position.

16. The head-worn display of claim 15, wherein the at least the second portion of the stem is structured to displace in a direction away from an outer surface of the housing and the at least the first portion of the stem is to remain engaged with the outer surface of the housing in response to the second portion displacing from the housing.

17. The head-worn display of claim 15, wherein the at least the second portion of the stem is structured to engage the outer surface of the housing when the image source is in the use position.

18. The head-worn display of claim 15, wherein the position locator is to maintain a position of the housing relative to the frame when the second end of the stem moves in a direction away from the housing.

19. The head-worn display of claim 1, further including the lens.

20. The head-worn display of claim 11, wherein the at least the portion of the stem is structured to form a gap between an inner surface of the stem and an outer surface of the housing in response to the second end moving relative to the first end.

21. The head-worn display of claim 1, further comprising a reflective material carried by the lens, wherein the image generator is positioned and oriented to project an image towards the reflective material.

* * * * *